(12) United States Patent
Deng et al.

(10) Patent No.: US 10,409,078 B2
(45) Date of Patent: Sep. 10, 2019

(54) LENSED BEAM-SPLITTER PRISM ARRAY AND ASSOCIATED METHOD

(71) Applicant: OmniVision Technologies, Inc., Santa Clara, CA (US)

(72) Inventors: Jau-Jan Deng, Taipei (TW); Regis Fan, Saint Paul, MN (US); Yi-Wei Liu, New TaiPei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 7 days.

(21) Appl. No.: 14/605,554

(22) Filed: Jan. 26, 2015

(65) Prior Publication Data
US 2016/0216524 A1 Jul. 28, 2016

(51) Int. Cl.
*G02B 27/12* (2006.01)
*G02B 27/28* (2006.01)
(Continued)

(52) U.S. Cl.
CPC ........ *G02B 27/126* (2013.01); *B29D 11/0073* (2013.01); *B29D 11/00432* (2013.01);
(Continued)

(58) Field of Classification Search
CPC ........ G02B 5/04; G02B 5/045; G02B 6/0025; G02B 26/0883; G02B 26/0891; G02B 27/0972; G02B 27/126; G02B 27/285
(Continued)

(56) References Cited

U.S. PATENT DOCUMENTS

| 4,896,952 A | * | 1/1990 | Rosenbluth | G02B 17/008 |
| | | | | 359/638 |
| 6,394,607 B1 | * | 5/2002 | Hashizume | G02B 5/3025 |
| | | | | 348/E5.141 |

(Continued)

FOREIGN PATENT DOCUMENTS

CN 104181692 A 12/2014

OTHER PUBLICATIONS

Rizea, et al., "Design Techniques for All-Dielectric Polarizing Beam Splitter Cubes, Under Constrained Situations", Romanian Reports in Physics, vol. 64, No. 2, p. 482-491, 2012.
(Continued)

*Primary Examiner* — Robert E. Tallman
*Assistant Examiner* — Gary W O'Neill
(74) *Attorney, Agent, or Firm* — Lathrop Gage LLP (57) ABSTRACT

A lensed beam-splitter prism array includes a beam-splitter substrate with a plurality of planar and parallel thin-film coatings each spanning a top substrate surface and a bottom substrate surface, and making an oblique angle therebetween, and a lens form layer formed on the top surface and having a plurality of lens forms, each lens form being above one of the plurality of coatings. A method for fabricating a lensed beam-splitter prism includes bonding a plurality of substrates to form a substrate stack having a coating between each adjacent substrate pair. The method also includes forming a stack slice by applying a plurality of parallel cuts at an oblique angle with respect to each coating. Each coating spans a first stack-slice surface and a second stack-slice surface opposing the first stack-slice surface. The method also includes forming a lens form layer on the first stack-slice surface spanning one or more coatings.

13 Claims, 8 Drawing Sheets

(51) Int. Cl.
  *G02B 5/30* (2006.01)
  *G02B 27/01* (2006.01)
  *B29D 11/00* (2006.01)
  *B29K 83/00* (2006.01)
(52) U.S. Cl.
  CPC ...... *B29D 11/00932* (2013.01); *G02B 5/3083* (2013.01); *G02B 27/0172* (2013.01); *G02B 27/285* (2013.01); *B29K 2083/00* (2013.01); *B29K 2995/0026* (2013.01); *B29K 2995/0034* (2013.01); *G02B 2027/0178* (2013.01)
(58) Field of Classification Search
  USPC ....... 359/619, 620, 625, 629–640, 678, 837; 362/339, 340
  See application file for complete search history.

(56) References Cited

U.S. PATENT DOCUMENTS

| | | | | |
|---|---|---|---|---|
| 2004/0263974 | A1* | 12/2004 | McDonough | G02B 5/3016 359/485.02 |
| 2006/0215119 | A1* | 9/2006 | Inamoto | G03B 21/2073 353/20 |
| 2008/0193749 | A1* | 8/2008 | Thompson | B29D 11/0073 428/343 |
| 2010/0128347 | A1 | 5/2010 | Huang | |
| 2011/0226332 | A1* | 9/2011 | Ford | F24J 2/067 136/259 |
| 2013/0010361 | A1* | 1/2013 | Hsiung | G02B 27/286 359/489.11 |

OTHER PUBLICATIONS

Azzam, "Simplified design of thin-film polarizing beam splitter using embedded symmetric trilayer stack", Appl. Opt. 50, 3316-3320 (2011).

Baranski, et al., "Wafer-Level Fabrication of Microcube-Typed Beam-Splitters by Saw-Dicing of Glass Substrate", IEEE Photonics Technology Letters, vol. 26, No. 1, Jan. 1, 2014.

Taiwan Application No. 105102403, English translation of first Office Action dated Feb. 15, 2017, 2 pages.

Chinese Patent Application No. 201610052336.1, Office Action dated Nov. 23, 2018, 6 pages.

* cited by examiner

LENSED BEAM-SPLITTER PRISM ARRAY AND ASSOCIATED METHOD

FIELD OF THE INVENTION

This invention relates to liquid-crystal-on-silicon (LCOS) displays and specifically, a lens-prism assembly used therein.

BACKGROUND

A head-mounted display system mounts to the head of a user such that the user may view an image produced by it. Generally, the display functions as a conveniently located interface with a computer, which may be included in the head-mounted display system. For example, a head-mounted display system may provide an aircraft pilot with maps and other information related to the real scene that the pilot is viewing. Some head-mounted display systems, described as "see-through," allow the user to view a displayed image at the same time as viewing a real scene in the user's line of sight. See-through head-mounted display systems overlay a display image on a real scene viewed by the user. Recent advances in micro-optics manufacturing have resulted in the development of see-through head-mounted display systems targeted for the consumer market, where the display system may provide functionality similar to that of a smartphone.

SUMMARY OF THE INVENTION

A lensed beam-splitter prism array is disclosed. The lensed beam-splitter array includes a beam-splitter substrate having a planar top substrate surface and a bottom substrate surface. The beam-splitter substrate has a plurality of planar and parallel thin-film coatings each spanning the top substrate surface and the bottom substrate surface and making an oblique angle therebetween. The lensed beam-splitter array also includes a form layer formed on the top substrate surface and having a plurality of lens forms, each lens form being above one of the plurality of thin-film coatings.

A method for fabricating a lensed beam-splitter prism includes bonding a plurality of substrates to form a substrate stack having a thin-film coating between each adjacent substrate pair. The method also includes forming a stack slice by applying a plurality of parallel cuts at an oblique angle with respect to each thin-film coating. Each thin-film coating spans a first stack-slice surface and a second stack-slice surface opposing the first stack-slice surface. The method also includes forming a lens form layer on the first stack-slice surface spanning one or more thin-film coatings. The lens form layer has a plurality of lens forms each located directly above one thin-film coating.

DETAILED DESCRIPTION

Figure 1:
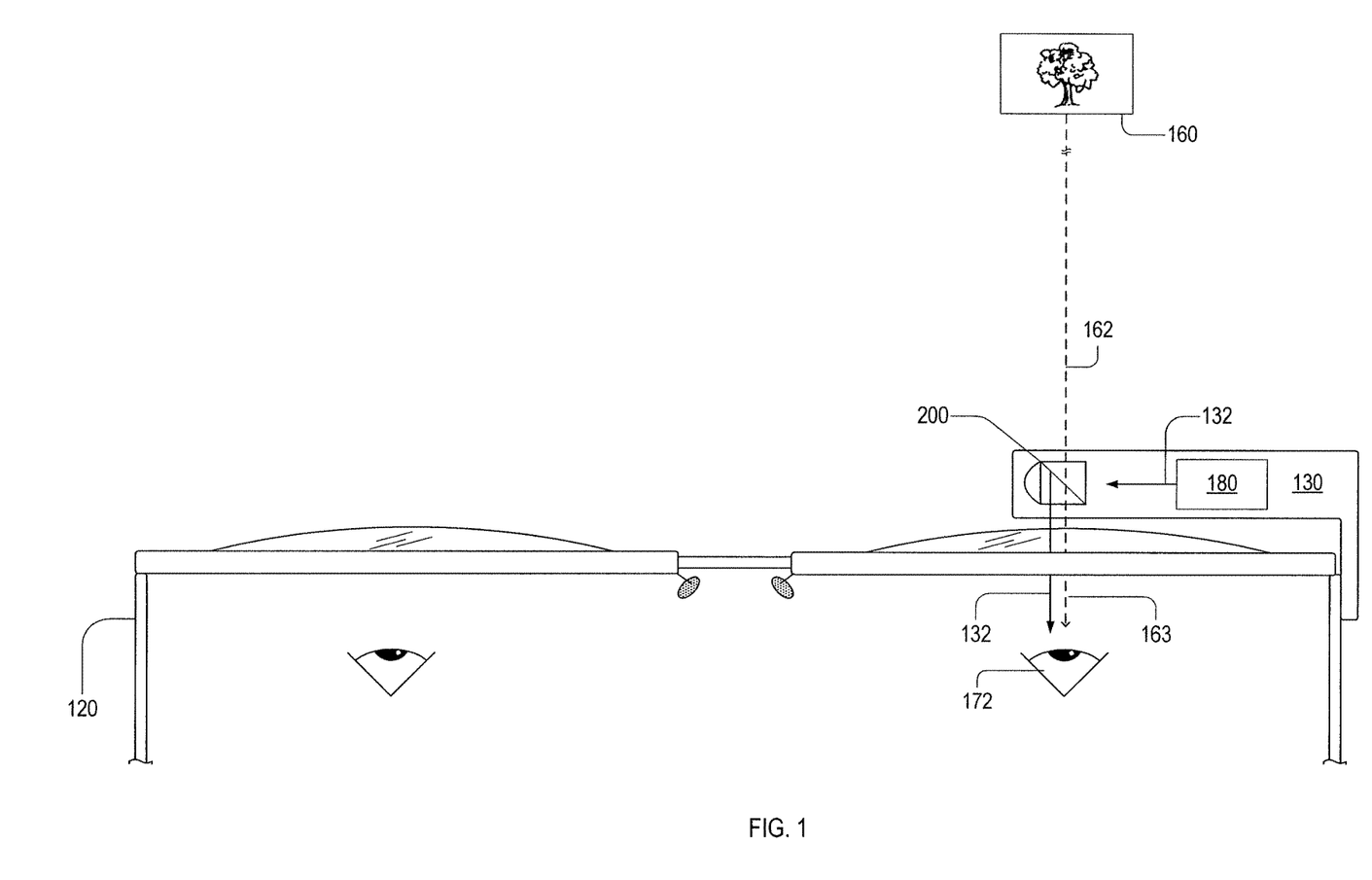
FIG. 1 is a plan view of a lensed beam-splitter prism within a see-through near-eye display device mounted to a pair of eyeglasses, in an embodiment.

FIG. 1 is a plan view showing exemplary use of a lensed beam-splitter prism 200 within a see-through near-eye display device 130 attached to eyeglasses 120. Near-eye display device 130 allows a user to simultaneously view a scene 160 and an image 132 generated by a display unit 180. Lensed beam-splitter prism 200 combines scene 160 and image 132 such that a user of eyeglasses 120 sees image 132 overlaid upon scene 160. Lensed beam-splitter prism 200 may alternately be employed in a different display device, such as in a hand-held image projector.

Figure 2:
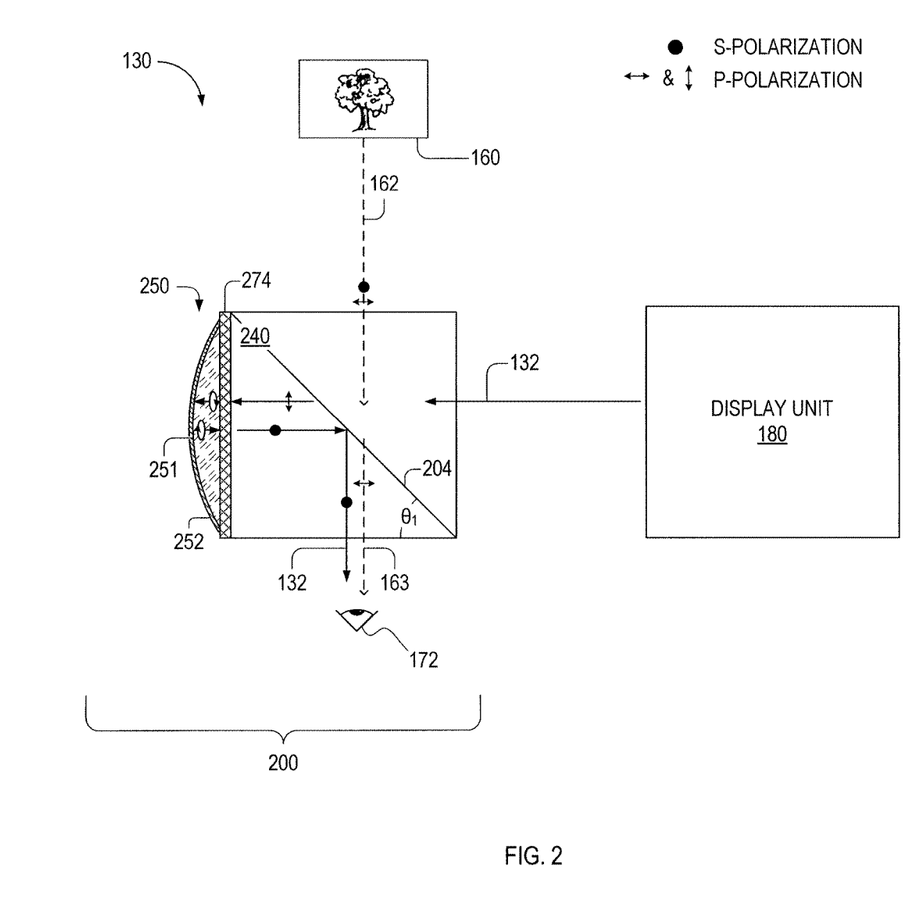
FIG. 2 is a plan view of the near-eye display device of FIG. 1 showing the lensed beam-splitter prism in further exemplary detail, in an embodiment.

FIG. 2 is a plan view of near-eye display device 130 of FIG. 1 showing use of lensed beam-splitter prism 200 in greater detail. Lensed beam-splitter prism 200 includes a thin-film coating 204 within a polarizing beam splitter (PBS) 240. In an embodiment, PBS 240 is a PBS cube and angle θ1=45 degrees. Lensed beam-splitter prism 200 further includes a curved reflector 250 and a quarter-wave plate 274. Curved reflector 250 may be formed of a lens 251 having a reflective coating 252 thereon.

In the example of FIG. 2, thin-film coating 204 functions as a thin-film polarizing beam-splitter and image 132 is p-polarized. Thin-film coating 204 may be non-polarizing without departing from the scope hereof, in which case image 132 may include other polarization states or be unpolarized. For example, thin-film coating 204 may transmit half of incident light and reflect half of incident light, regardless of polarization. Light polarization state indicated herein refers to the ideal polarization state of the light, whereas the actual polarization state may include non-ideal components, without departing from the scope hereof. For example, image 132 may include a small s-polarized component.

Image 132 enters PBS 240. A portion of image 132 is transmitted by thin-film coating 204 and through quarter-wave plate 274. Reflective coating 252 reflects image 232 back through quarter-wave plate 274 towards thin-film coating 204. The double-pass of image 132 through quarter-wave plate 274 changes image 132 from p-polarized to s-polarized, which enables thin-film coating 204 to reflect it toward eye 172.

Lensed beam-splitter prism 200 also receives light 162 from scene 160, the p-polarization component of which is transmitted by thin-film coating 204 and propagates towards eye 172 as p-polarized light 163. Accordingly, eye 172 sees image 132 from display unit 180, received by eye 172 as s-polarized light, superimposed on an image of ambient scene 160, received by eye 172 as p-polarized light.

Figure 3:
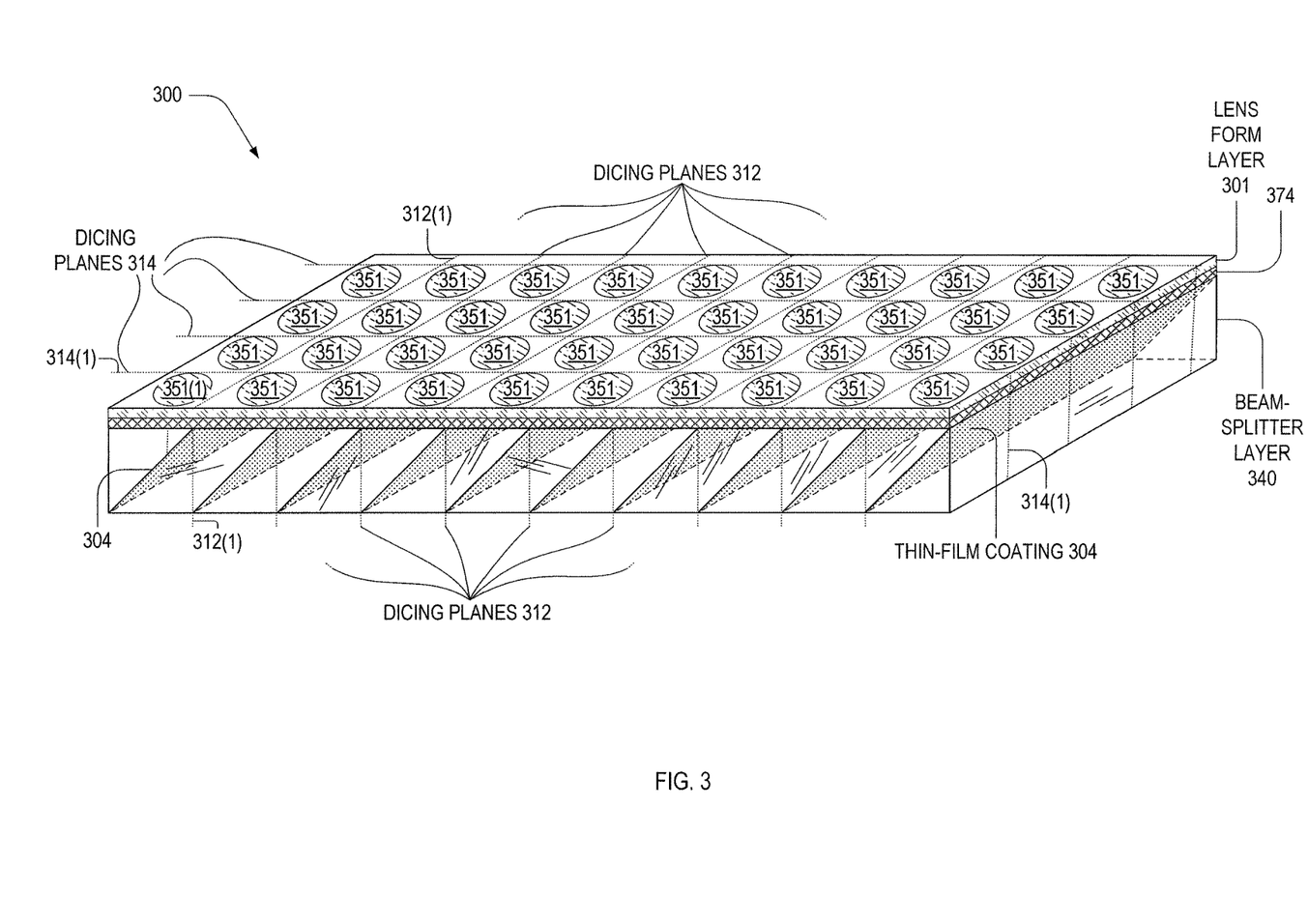
FIG. 3 is a perspective view of a lensed beam-splitter prism array formed at the wafer level, in an embodiment.

FIG. 3 is a perspective view of lensed beam-splitter prism 200 prior to separation from a lensed beam-splitter prism array 300 formed at the wafer level. Lensed beam-splitter prism 200 may include a lens form 351(1) and be formed by dicing lensed beam-splitter prism array 300 along a dicing planes 312(1) and 314(1).

Lensed beam-splitter prism array 300 includes lens form layer 301 and a beam-splitter substrate 340. Beam-splitter substrate 340 includes a plurality of coating layers 304 that are mutually parallel to each other. Prior to dicing, quarter-wave plate 274 is formed as a middle layer 374 between lens form layer 301 and beam-splitter substrate 340. Middle layer 374 is for example formed of a birefringent material that functions as a quarter-wave plate at visible wavelengths. Lens form layer 301 includes a plurality of lens forms 351.

In an embodiment, middle layer 374 may be formed of multiple thin-film layers. For example, middle layer 374 may include a quarter-wave plate and a single-layer or multi-layer anti-reflective coating. Alternatively, a lensed beam-splitter prism array may lack a middle layer 374.

Lensed beam-splitter prism array 300 may be singulated along dicing planes 312 and 314 to form a plurality of lensed beam-splitter prisms 200. For example, in lensed beam-splitter prisms 200, FIG. 2, thin-film coating 204 is a portion of coating layer 304, quarter-wave plate 274 is portion of middle layer 374, and lens 251 is a portion of lens form layer 301 that includes a lens form 351. While FIG. 3 shows beam-splitter substrate 340 to be rectangular, beam-splitter substrate 340 may be a different shape, such as cylindrical, without departing from the scope hereof.

Figure 4:
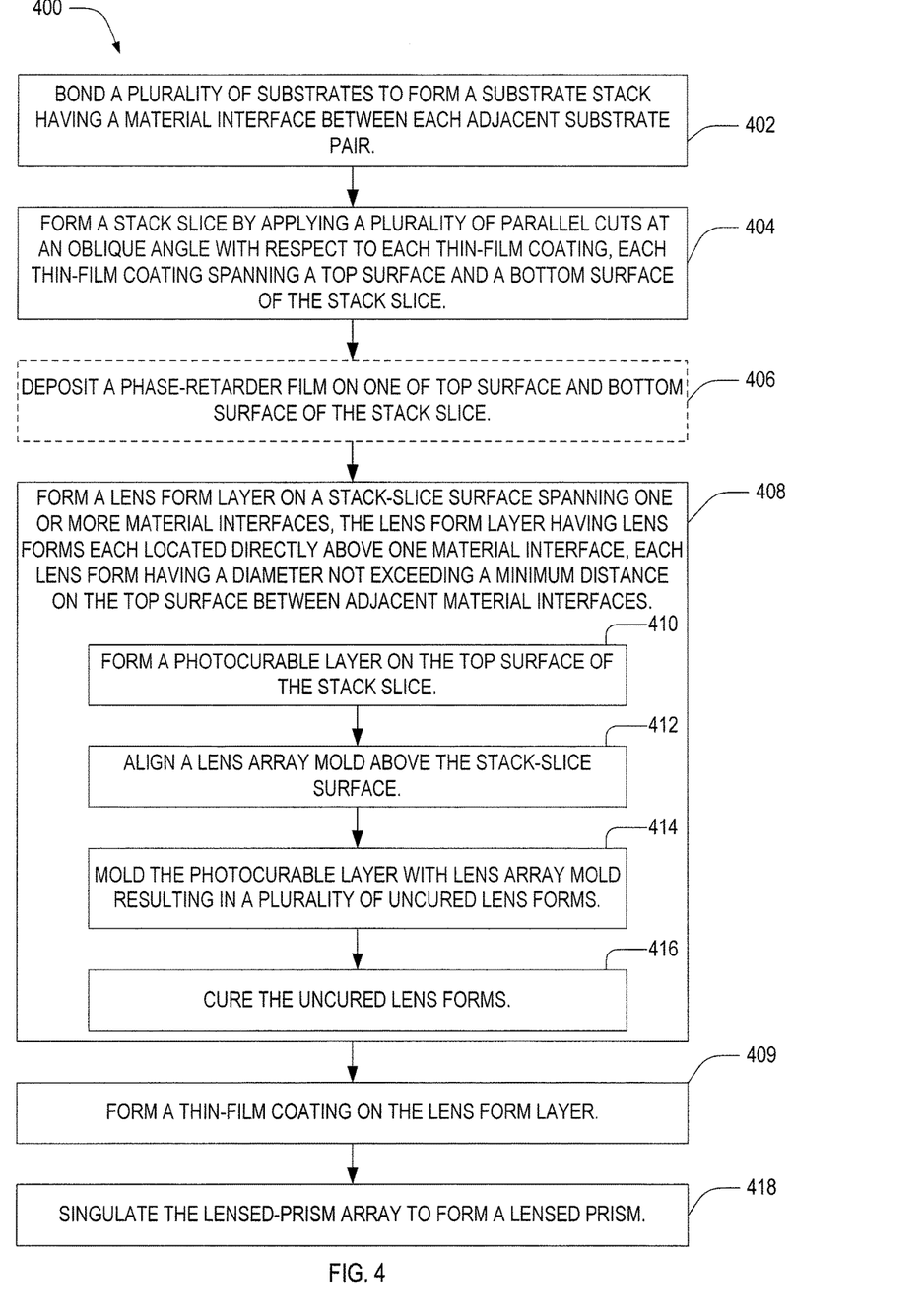
FIG. 4 is a flowchart illustrating a wafer-level method for fabricating the lensed beam-splitter prism array of FIG. 3, in an embodiment.

FIG. 4 is a flowchart illustrating a wafer-level method 400 for fabricating lensed beam-splitter prism array 300. FIGS. 5-12 illustrate steps of method 400. FIGS. 5-12 are best viewed together with FIG. 4 and the following description.

Figure 5:
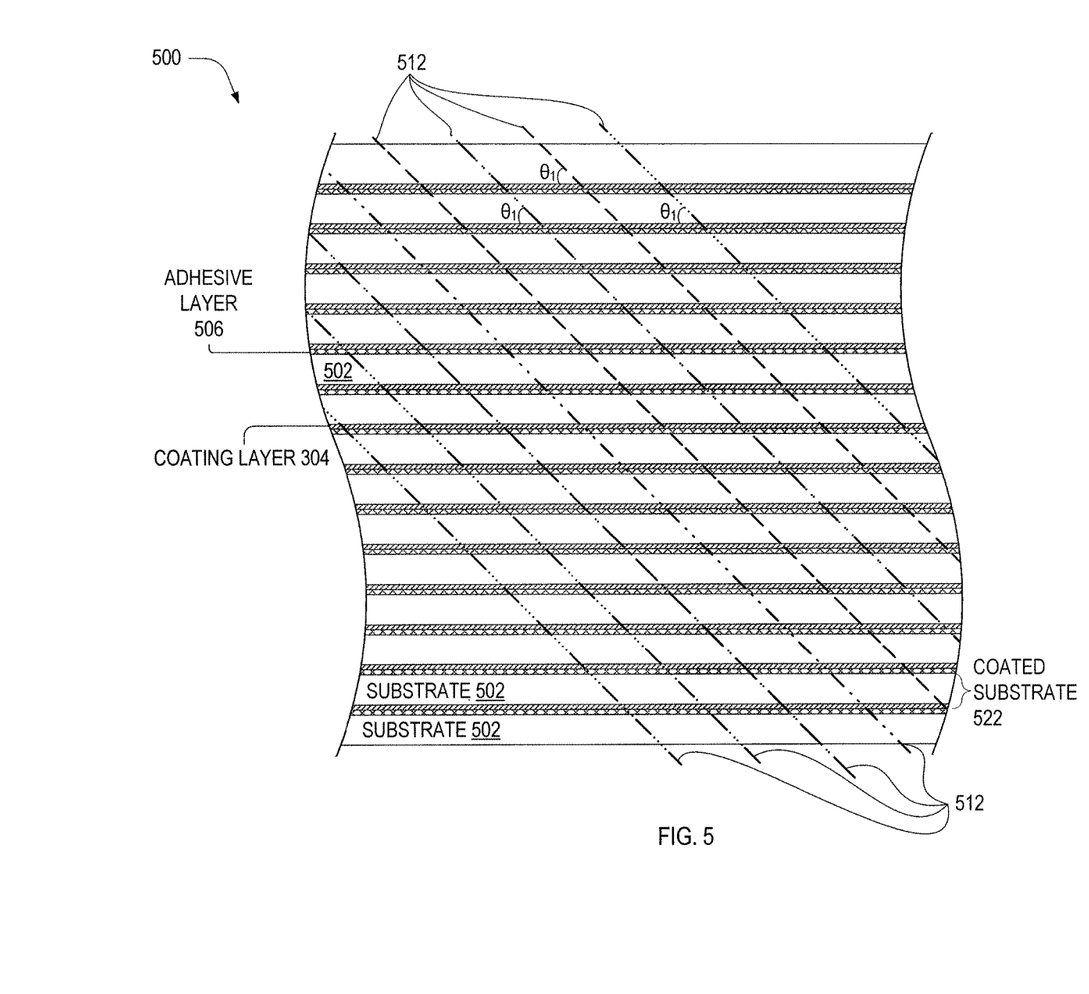
FIG. 5 is a cross-sectional view of coated substrates bonded together to form a coated-substrate stack, in an embodiment.

In step 402, method 400 bonds a plurality of coated substrates together to form a substrate stack having a thin-film coating between each adjacent substrate pair. In an example of step 402, coated substrates 522 are bonded together with an adhesive layer 506 to form a coated-substrate stack 500, as shown in FIG. 5. Each coated substrate 522 includes a substrate 502 and coating layer 304, which may be a partial reflector or a polarizing-beam splitting film. Substrate 502 is for example a circular wafer with an eight-inch diameter. Each pair of adjacent substrates 502 has a coating layer 304 therebetween. In an embodiment, one or more pairs of adjacent substrates 502 may lack a coating layer therebetween without departing from the scope hereof. For clarity of illustration, in FIG. 5 not all substrates 502, coating layers 304, and adhesive layers 506 are labeled with a reference numeral.

In step 404, method 400 forms a stack slice by applying a plurality of parallel cuts at an oblique angle with respect to each thin-film coating, each thin-film coating spanning a top surface and a bottom surface of the stack slice. In an example of step 404, beam-splitter substrate 340 (FIG. 6) is formed by applying a plurality of parallel cuts along cutting planes 512 at an oblique angle $\theta_1$ with respect to each thin-film coating. Oblique angle $\theta_1$ may be between 40 degrees and 50 degrees. In an embodiment, oblique angle $\theta_1$ is 45 degrees.

Figure 6:
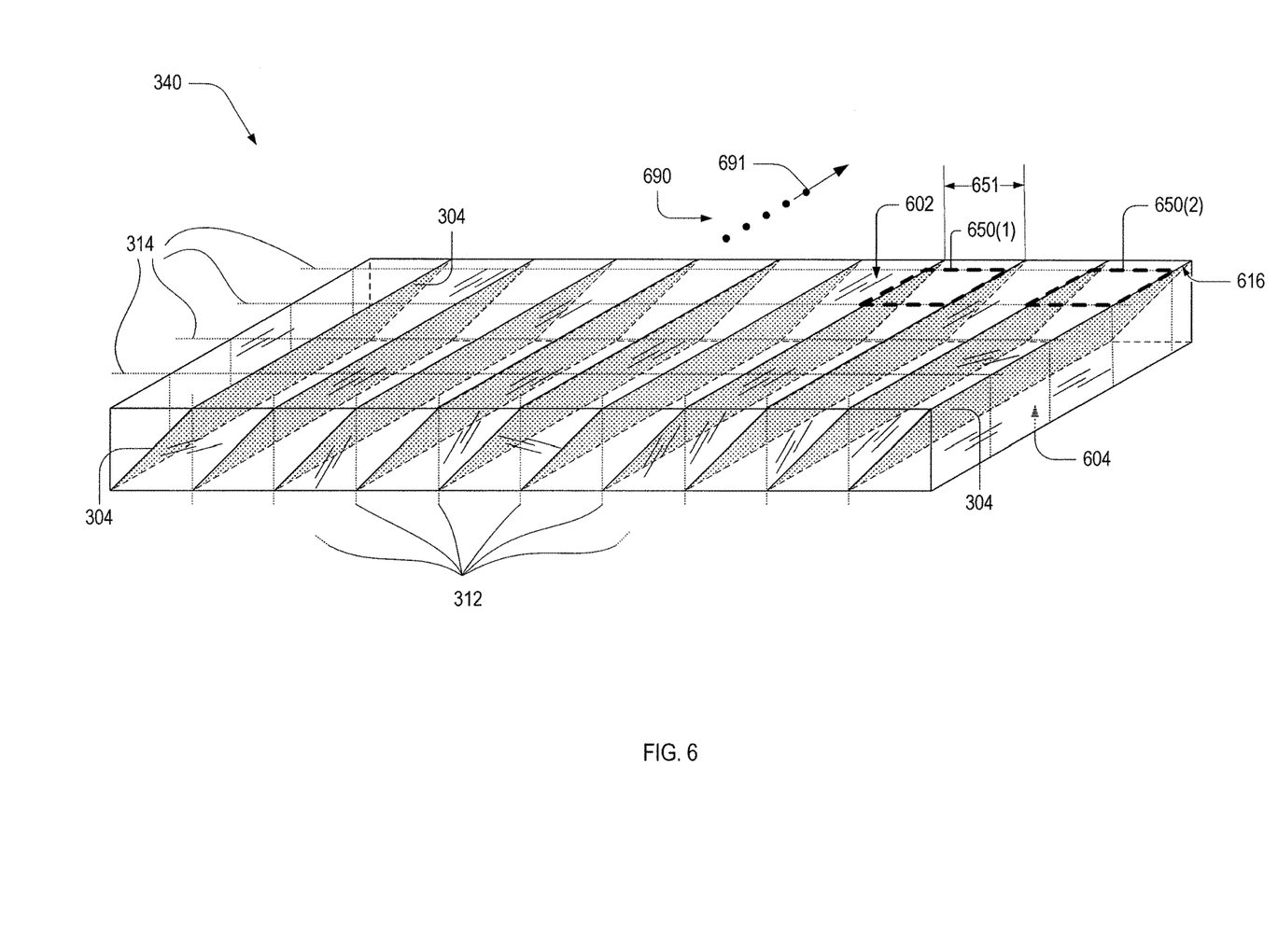
FIG. 6 is a perspective cross-sectional view of a stack slice formed from cutting the coated substrate stack of FIG. 5 along one or more cutting planes, in an embodiment.

FIG. 6 is a perspective cross-sectional view of beam-splitter substrate 340 formed from cutting coated substrate stack 500 along one or more cutting planes 512. Coating layers 304 are between a top surface 602 and a bottom surface 604 of beam-splitter substrate 340. Dotted line 690 indicates that beam-splitter substrate 340 and coating layers 304 may be longer in the direction of arrow 691.

Top surface 602 includes a plurality of regions 650 bound by one or more intersecting dicing planes 312 and 314 and in some cases an edge of beam-splitter substrate 340. For example, region 650(1) is bound by a pair of dicing planes 312 and a pair of dicing planes 314, and region 650(2) is bound by a dicing plane 312, a pair of dicing planes 314, and an edge 616 of beam-splitter substrate 340. Each dicing plane 312 spans an adjacent pair of coating layers 304. Beam-splitter substrate 340 may be diced along dicing planes 312 and 314 to form a plurality of beamsplitter cubes each having one region 650 as a surface.

Figure 7:
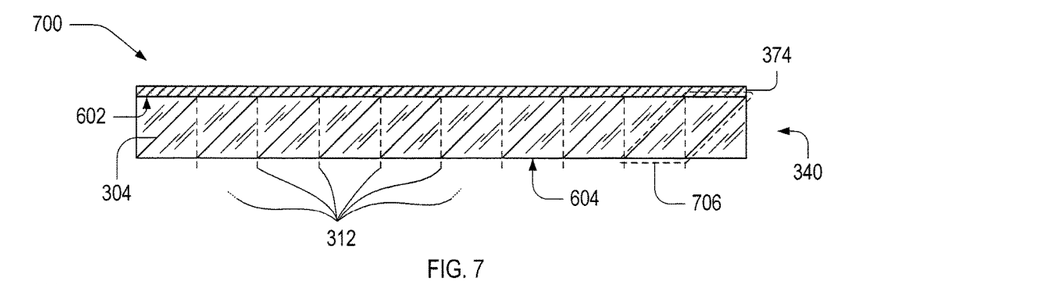
FIG. 7 is a cross-sectional view of the stack slice of FIG. 6 with a phase-retarder film deposited thereon, in an embodiment.

Step 406 is optional. If included, in step 406, method 400 deposits a middle layer on one of a top surface and a bottom surface of the stack slice. In an example of step 406, middle layer 374 is formed on top surface 602 of beam-splitter substrate 340 to form a coated stack slice 700, as shown in FIG. 7. FIG. 7 is a cross-sectional view of beam-splitter substrate 340 with middle layer 374 deposited thereon. The cross-sectional view of FIG. 7 illustrates that beam-splitter substrate 340 includes a plurality of segments 706 each having a parallelogram cross-section. For clarity of illustration, FIG. 7 includes a reference number for only one coating layer 304 and one segment 706.

Step 406 may be included when coating layer 304 is a PBS film that operates as thin-film coating 204 of FIG. 2. In such a case, middle layer 374 has a quarter-wave optical thickness that enables it to operate as quarter-wave plate 274 of FIG. 2.

In step 408, method 400 forms a lens form layer on a stack-slice surface spanning one or more thin-film coatings, the lens form layer having lens forms each located directly above a thin-film coating, each lens form having a diameter not exceeding, on the top surface, a minimum distance between adjacent thin-film coatings. It will be appreciated that step 408 does not require that the lens form layer is formed directly on the top surface of the stack slice. For example, if method 400 includes step 406, the top surface of the stack slice is a surface of the phase-retarder film.

Figure 8:
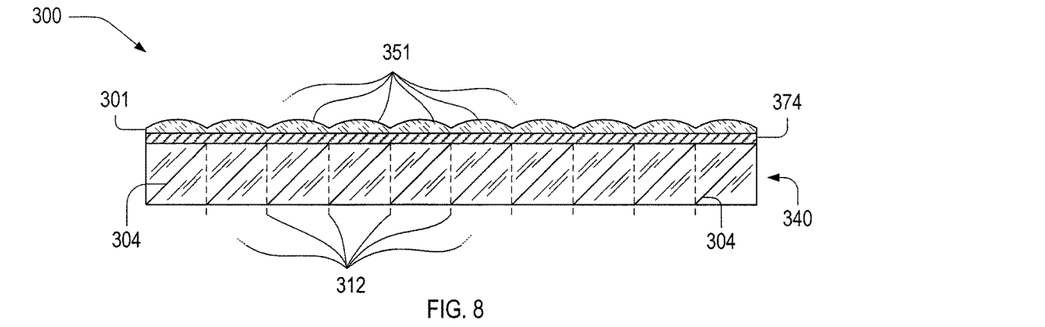
FIG. 8 is a cross-sectional view of a lensed beam-splitter prism array formed from the stack slice of FIG. 7, in an embodiment.

In an example of step 408, lens form layer 301 is formed on middle layer 374 to form lensed beam-splitter-prism array 300. Lens form layer 301 includes a plurality of lens forms 351. Each lens form 351 is located on a respective one of the plurality of regions 650, FIG. 6. On top surface 602, adjacent coating layers 304 are separated by a minimum distance 651 that corresponds to a length dimension of each region 650. FIG. 8 is a cross-sectional view of lensed beam-splitter-prism array 300. A center of each lens form 351 is aligned with a center of a respective coating layer 304.

Figure 9:
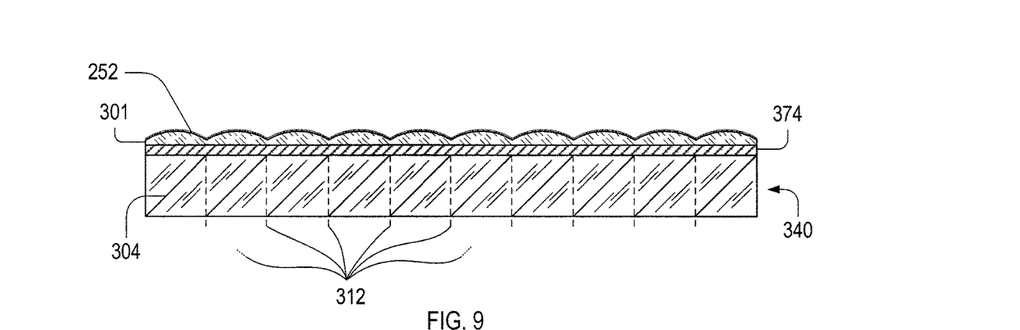
FIG. 9 is a cross-sectional view of a lensed beam-splitter prism array of FIG. 7, with a thin-film coating thereon, in an embodiment.

Step 409 is optional. If included, in step 409, method 400 forms a thin-film coating on the lens form layer. In an example of step 409, a reflective coating 252 is formed on lens form layer 301, as shown in FIG. 9.

Figure 10:
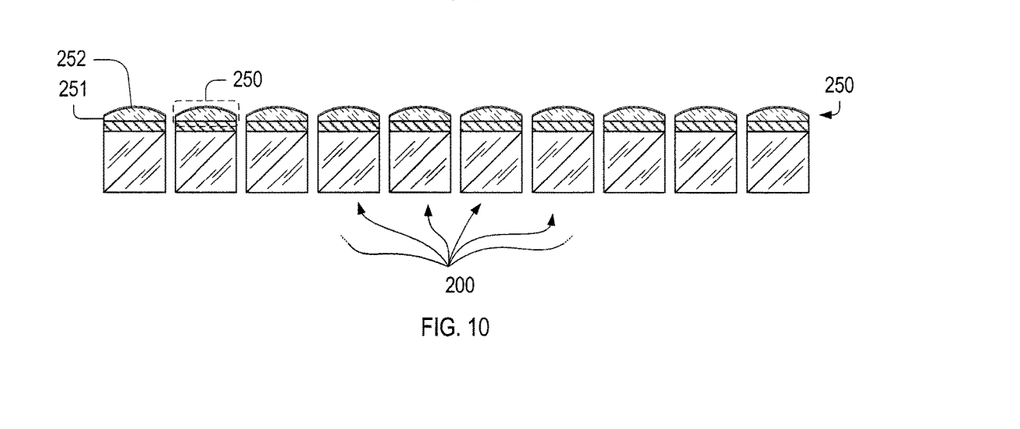
FIG. 10 is a cross-sectional view of lensed prisms formed by singulating the lensed beam-splitter prism array of FIG. 8, in an embodiment.

In step 418, method 400 singulates the lensed beam-splitter prism array to form a lensed prism. In an example of step 418, lensed beam-splitter-prism array 300 is diced along dicing planes 312 and 314 (FIG. 3) to form a plurality of lensed beam-splitter prisms 200, as shown in FIG. 10. Each lensed beam-splitter prism 200 includes one lens 251, corresponding to one lens form 351, with reflective coating 252 thereon.

Figure 11:
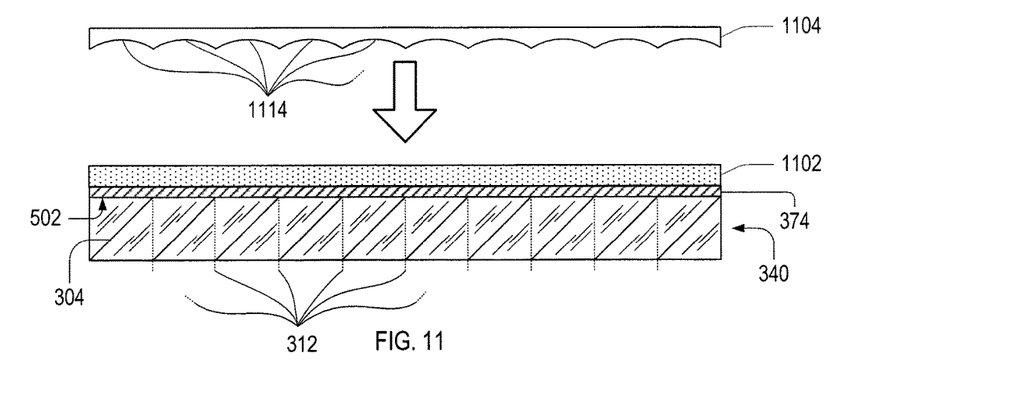
FIG. 11 is a cross-sectional view of the stack slice of FIG. 7 with a photocurable layer thereon, in an embodiment.

In an embodiment of method 400, step 408 includes steps 410, 412, 414, and 416. In step 410, method 400 forms a photocurable layer on the top surface of the stack slice. It will be appreciated that step 410 does not require that the photocurable layer is formed directly on the top surface of the stack slice. For example, if method 400 includes step 406, the top surface of the stack slice is a surface of the phase-retarder film. In an example of step 410, a photocurable layer 1102 is formed on middle layer 374, as shown in FIG. 11. Photocurable layer 1102 is, for example, a UV-curable adhesive.

In step 412, method 400 aligns a lens array mold above the stack-slice surface. The lens array mold has a plurality of inverse lens forms located directly above a thin-film coating and having a diameter not exceeding a distance between adjacent thin-film coatings intersecting the stack-slice surface. In an example of step 412, lens array mold 1104 is aligned above top surface 602. Lens array mold 1104 includes a plurality of inverse lens forms 1114 each located directly above a respective coating layer 304 within beam-splitter substrate 340.

Figure 12:
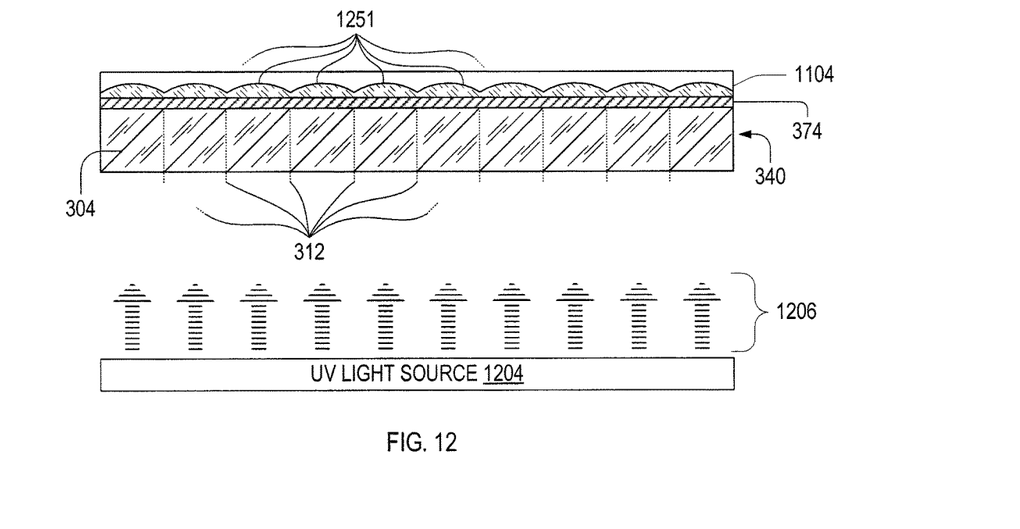
FIG. 12 is a cross-sectional view of the stack slice of FIG. 10, with the photocurable layer molded by a lens array mold, in an embodiment.

In step 414, method 400 molds the photocurable layer with the lens array mold resulting in a plurality of uncured lens forms. In an example of step 414, lens array mold 1104 molds photocurable layer 1102 resulting in a plurality of uncured lens forms 1251. Lens array mold 1104 is made of polydimethylsiloxane (PDMS), for example.

In step 416, method 400 cures the uncured lens forms, resulting in a plurality of lenses. In an example of step 416, a UV light source 1204 emits UV light 1206 (FIG. 12) that cures uncured lens forms 1202, resulting in lens forms 351.

Combinations of Features

Features described above as well as those claimed below may be combined in various ways without departing from the scope hereof. The following examples illustrate possible, non-limiting combinations the present invention has been described above, it should be clear that many changes and modifications may be made to the method and product without departing from the spirit and scope of this invention:

(A1) A lensed beam-splitter prism array may include a beam-splitter substrate having a planar top substrate surface and a bottom substrate surface. The beam-splitter substrate has a plurality of planar and parallel thin-film coatings each spanning the top substrate surface and the bottom substrate surface and making an oblique angle therebetween. The lensed beam-splitter prism also may include a lens form layer formed on the top substrate surface and having a plurality of lens forms, each lens form being above one of the plurality of thin-film coatings.

(A2) In the lensed beam-splitter prism denoted as (A1), the bottom substrate surface may be planar and parallel to the top substrate surface.

(A3) In one or both of the lensed beam-splitter prism denoted as (A1) and (A2), the oblique angle may be substantially equal to 45 degrees.

(A4) In any of the lensed beam-splitter prism denoted as (A1) through (A3), a center of each lens form may be aligned with a center of one the plurality of thin-film coatings.

(A5) In any of the lensed beam-splitter prism denoted as (A1) through (A4), the beam-splitter substrate may include a plurality of mutually parallel segments each having a parallelogram cross-section including (a) a first surface parallel to a second surface and (b) a third surface parallel to a fourth surface, wherein each first surface and second surface constitutes part of the top substrate surface and bottom substrate surface, respectively, and each third surface a fourth surface forms a thin-film coating with an adjacent parallel segment.

(A6) In any of the lensed beam-splitter prism denoted as (A1) through (A5), each lens form may have a diameter not exceeding, on the top surface, a minimum distance between adjacent thin-film coatings.

(A7) In any of the lensed beam-splitter prism denoted as (A1) through (A6), the lens form layer may be contiguous.

(B1) A method for fabricating a lensed beam-splitter prism may include bonding a plurality of substrates to form a substrate stack having a thin-film coating between each adjacent substrate pair. The method may also include forming a stack slice by applying a plurality of parallel cuts at an oblique angle with respect to each thin-film coating, each thin-film coating spanning a first stack-slice surface and a second stack-slice surface opposing the first stack-slice surface. The method may also include forming a lens form layer on the first stack-slice surface spanning one or more thin-film coatings, the lens form layer having a plurality of lens forms each located directly above one thin-film coating.

(B2) The method denoted as (B1) may further include depositing a phase-retarder film on the first stack-slice surface.

(B3) In one or both of the methods denoted as (B1) and (B2), the step of forming the lens form layer may further include aligning a lens array mold above the first stack-slice surface. The lens array mold has a plurality of inverse lens forms each located directly above one thin-film coating and having a diameter not exceeding a distance between adjacent thin-film coatings intersecting the first stack-slice surface. The step of forming the lens form layer may also include molding the photocurable layer with the lens array mold resulting in a plurality of uncured lens forms.

(B4) The method denoted as (B3) may further include forming the photocurable layer on the first stack-slice surface.

(B5) One or both of the methods denoted as (B3) and (B4) may further include curing the uncured lens forms.

(B6) Any of the methods denoted as (B1) through (B5) may further include singulating the lensed beam-splitter prism array to form a lensed beam-splitter prism.

(B7) In any of the methods denoted as (B1) through (B6), each lens form may have a diameter not exceeding, on the top surface, a minimum distance between adjacent thin-film coatings.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A lensed beam-splitter prism array, comprising:
a beam-splitter substrate having a planar top substrate surface and a bottom substrate surface, the beam-splitter substrate having a plurality of planar and parallel polarizing thin-film coatings each (a) spanning the top substrate surface and the bottom substrate surface and making an oblique angle therebetween, and (b) being spatially-separated from an adjacent polarizing thin-film coating by a single continuous portion of the beam-splitter substrate having a thickness that defines a minimum distance between adjacent polarizing thin-film coatings, each pair of adjacent portions of the beam-splitter substrate having therebetween one of the plurality of polarizing thin-film coatings;

a lens form layer formed on the top substrate surface and having a plurality of lens forms, each lens form being above one of the plurality of polarizing thin-film coatings; and a quarter-wave phase-retarder film located between the top substrate surface and the lens form layer.

2. The lensed beam-splitter prism array of claim 1, the bottom substrate surface being planar and parallel to the top substrate surface.

3. The lensed beam-splitter prism array of claim 1, the oblique angle being substantially equal to 45 degrees.

4. The lensed beam-splitter prism array of claim 1, a center of each lens form being aligned with a center of one the plurality of polarizing thin-film coatings.

5. The lensed beam-splitter prism array of claim 1, the beam-splitter substrate comprising a plurality of mutually parallel segments each having a parallelogram cross-section including (a) a first surface parallel to a second surface and (b) a third surface parallel to a fourth surface, wherein each first surface and second surface constitutes part of the top substrate surface and bottom substrate surface, respectively, and each third surface and fourth surface forming a polarizing thin-film coating with an adjacent parallel segment.

6. The lensed beam-splitter prism array of claim 1, each lens form having a diameter not exceeding, on the top substrate surface, a minimum distance between adjacent polarizing thin-film coatings separated by the thickness.

7. The lensed beam-splitter prism array of claim 1, the lens form layer being contiguous.

8. The lensed beam-splitter prism array of claim 1, further comprising a reflective coating on the lens form layer, the lens form layer being between the reflective coating and the quarter-wave phase-retarder film.

9. A method for fabricating a lensed beam-splitter prism comprising:

bonding at least three substrates to form a substrate stack having a respective one of a plurality of polarizing thin-film coatings between each adjacent substrate pair of the at least three substrates, a distance between any two adjacent polarizing thin-film coatings corresponding to a thickness of a single continuous portion of one of the at least three substrates therebetween;

forming a stack slice by applying a plurality of parallel cuts to the substrate stack at an oblique angle with respect to each polarizing thin-film coating, each polarizing thin-film coating spanning a first stack-slice surface and a second stack-slice surface opposing the first stack-slice surface;

depositing a quarter-wave phase-retarder film on the first stack-slice surface; and forming a lens form layer on the quarter-wave phase-retarder film first stack slice surface spanning one or more polarizing thin-film coatings, the lens form layer having a plurality of lens forms each located directly above a respective one of the plurality of polarizing thin-film coatings, the quarter-wave phase-retarder film being between the lens form layer and the first stack-slice surface.

10. The method of claim 9, the step of forming the lens form layer comprising:

aligning a lens array mold above the first stack-slice surface, the lens array mold having a plurality of inverse lens forms each located directly above a respective one of the plurality of polarizing thin-film coatings and having a diameter not exceeding a distance between adjacent polarizing thin-film coatings intersecting the first stack-slice surface and;

molding a photocurable layer, formed on the first stack-slice surface, with the lens array mold resulting in a plurality of uncured lens forms.

11. The method of claim 9, further comprising singulating the lensed beam-splitter prism array to form a lensed beam-splitter prism.

12. The method of claim 9, each lens form having a diameter not exceeding, on the top substrate surface, a minimum distance between adjacent polarizing thin-film coatings separated by the thickness.

13. The method of claim 9, further comprising forming a reflective coating on the lens form layer, the lens form layer being between the reflective coating and the quarter-wave phase-retarder film.

* * * * *